(12) United States Patent
Cheng et al.

(10) Patent No.: US 6,355,292 B1
(45) Date of Patent: Mar. 12, 2002

(54) PRECARBONATION PROCESS TO REDUCE FOAMING

(75) Inventors: Alan T. Cheng, Livingston, NJ (US); Pedro L. Durao, Rio de Janeiro (BR)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/492,759

(22) Filed: Jan. 27, 2000

(51) Int. Cl.$^7$ .................................................. C12G 1/06
(52) U.S. Cl. ......................... 426/477; 426/590; 426/487
(58) Field of Search ................................ 426/477, 590, 426/487; 99/323.2; 261/DIG. 7

(56) References Cited

U.S. PATENT DOCUMENTS

| | | | |
|---|---|---|---|
| 3,256,802 A | 6/1966 | Karr | 99/275 |
| 3,323,783 A | 6/1967 | Schwertfeger et al. | 261/35 |
| 3,552,726 A | 1/1971 | Kraft | 261/50 |
| 3,583,601 A | 6/1971 | Ayers | 222/1 |
| 3,780,198 A | 12/1973 | Pahl et al. | 426/477 |
| 3,877,358 A | 4/1975 | Karr | 99/275 |
| 3,960,164 A | 6/1976 | Kelley | 137/202 |
| 4,112,828 A | 9/1978 | Mojonnier et al. | 99/275 |
| 4,187,262 A | 2/1980 | Fessler et al. | 261/50 B |
| 4,191,784 A | 3/1980 | Mojonnier et al. | 426/475 |
| 4,265,167 A | 5/1981 | Mojonnier et al. | 99/323.2 |
| 4,265,376 A | 5/1981 | Skidell | 222/189 |
| 4,352,679 A | * 10/1982 | Notardonato et al. | |
| 4,482,509 A | 11/1984 | Iannelli | 261/64 B |
| 4,518,541 A | 5/1985 | Harris | 261/27 |
| 4,708,827 A | 11/1987 | McMillin | 261/35 |
| 4,882,097 A | 11/1989 | Shannon | 261/35 |
| 5,474,717 A | 12/1995 | Bucher et al. | 261/140.1 |
| 5,792,391 A | 8/1998 | Vogel | 261/121.1 |

* cited by examiner

*Primary Examiner*—Anthony J. Weier
(74) *Attorney, Agent, or Firm*—Donald T. Black

(57) ABSTRACT

The tendency of carbonated beverage to generate excessive foam when it is produced and bottled is reduced in a process including: (a) providing water or a mixture of water and syrup, which contains oxygen or air dissolved therein, and maintaining a pressure greater than atmospheric thereon; (b) saturating said mixture with carbon dioxide, and feeding the resultant mixture to step (c), while maintaining sufficient pressure thereon that no dissolved gas evolves therefrom; and (c) removing dissolved oxygen or air from the mixture formed in step (b) while dissolving additional carbon dioxide into said mixture and maintaining over said mixture a pressure greater than atmospheric.

20 Claims, No Drawings

PRECARBONATION PROCESS TO REDUCE FOAMING

FIELD OF THE INVENTION

The present invention relates to the production of carbonated beverages, by which is meant potable carbonated water per se and potable carbonated water containing also other ingredients such as flavoring. More particularly, this invention relates to processes and apparatus for producing carbonated beverages which when they are packaged exhibit reduced losses of carbonation, beverage, and containers.

BACKGROUND OF THE INVENTION

In conventional carbonation practice, carbon dioxide is added to water or to e.g. a syrup-water mixture, preferably chilled, to produce a carbonated product. Normally, the carbon dioxide is dissolved under high pressure to saturate the water at a high equilibrium level. After the product is filled into containers, the pressure is reduced to one atmosphere at a controlled rate. Part of the carbon dioxide comes out of the solution, forming foam on top of the liquid surface. The product is generally capped before most of the carbon dioxide can escape.

If foaming is excessive, the filling and depressurization rate must be reduced to avoid spilling. However, a reduced filling and depressurization rate will reduce the rate of production. This will reduce the productivity substantially.

On the other hand, working at high pressure in the filling line can cause bursting or deformation of some pressurized bottles. Glass and plastic bottle bursting and deformation impose significant costs to fillers, as product is lost and the plant suffers extra expenses of stoppages and of replacing and disposal of broken bottles. Bursting of glass bottles can also be dangerous to the factory workers.

Thus, there is a need to increase beverage production rates without wasting ingredients such as syrup and soda water, and without the risks and costs accompanying bursting of bottles.

It is generally believed that dissolved air is one of the major causes of excessive foaming. Therefore, a vacuum de-aeration step is used in the industry to remove dissolved air from the water before it is mixed with any other ingredients and before carbonation. The equipment used to remove the air is called a de-aerator. The vacuum is usually provided by a vacuum pump. A typical de-aerator comprises an empty chamber with the water flowing through while a vacuum of 1–5 psia is applied.

Unfortunately, such a process has shown only limited improvements to the foaming problem. Further reduction in foaming, and increased rates of bottle filling, have thus not been possible. The loss of carbon dioxide in this process is also very high during the depressurization step.

Attempts to de-aerate the syrup, such as with a small amount of gas bleeding off from the carbonator, have not succeeded. Since the heavy syrup is very viscous, an excessively large volume of stripping gas is necessary to achieve desirable dissolved air removal.

BRIEF SUMMARY OF THE INVENTION

One aspect of the present invention is a process for producing a carbonated beverage having a reduced tendency to undesired foaming, comprising:

(a) providing potable water (which may already be mixed with syrup or other ingredients) which contains oxygen or air dissolved therein, and maintaining a pressure greater than atmospheric thereon;

(b) saturating said water with carbon dioxide while maintaining sufficient pressure thereon that no gas evolves therefrom, and feeding the resultant mixture to step (c) while maintaining sufficient pressure thereon that no gas evolves therefrom; and (c) removing dissolved oxygen or air from the mixture formed in step (b) while dissolving carbon dioxide into said mixture and maintaining over said mixture a pressure greater that atmospheric. Preferably, the dissolved oxygen or air that is removed from the mixture is vented away from the mixture while the pressure is maintained over the mixture. The carbonated beverage is then recovered from step (c) and is sealed into packaging.

DETAILED DESCRIPTION OF THE INVENTION

The present invention provides numerous unexpected advantages in practice. For instance, the beverage exhibits significantly reduced foaming when it is filled into bottles and other containers. This allows the filling machines to be operated at higher speeds, thus affording higher production rates. This also allows the filling machine to be operated at reduced pressure, while still realizing both reduced levels of foaming and adequate levels of carbonation in the beverage, thereby resulting in reduced carbon dioxide consumption.

The invention can treat mixtures of water and syrup. By "syrup" is meant any product which can be combined with water to form a potable beverage. Syrups are typically mixtures of ingredients, including flavoring agents, sweeteners and other functional additives, and may (but need not) contain a small amount of water. Components of the syrup can be water-soluble or water-dispersible.

The water should be potable. In conventional practice it is treated by the operator to render it safe and clean. Typically, the incoming potable water is first treated to remove dissolved solids and color. It is then sterilized and filtered. The treated potable water can be de-aerated also to remove the bulk of the dissolved air. Techniques for de-aeration of water at this stage are well known in this field.

The treated potable water can then be chilled, e.g. to 5–10° C., through any suitable device such as a continuous chiller. Alternatively, the water can be chilled in the equipment used in step (c) wherein air or oxygen is removed from the product following carbonation. Cooling the water improves the solubility of carbon dioxide therein.

In the manufacture of soda with syrup, the syrup is then metered into a mixer and diluted with the water to form a mixture of water and syrup. The ratio of syrup to water is a matter of choice depending on the syrup and the preference of the operator; the determination of typical ratios is well within the conventional level of skill in this field. The mixture of syrup and water contains oxygen dissolved therein. Typically, the mixture will contain air dissolved therein, which of course contains oxygen. However, the description herein will refer to dissolved oxygen, it being understood that it is not limited to oxygen as the dissolved gas. Typically, for every part of oxygen dissolved from air, the mixture will contain 1.5 times as much nitrogen. Oxygen is used herein to refer to dissolved gas because the dissolved oxygen level is measurable with a dissolved-oxygen meter whereas dissolved nitrogen is much more difficult to measure.

At room temperatures, syrup may contain on the order of 10 mg/L of oxygen whereas deaerated water may contain on the order of 1 mg/L of oxygen. Therefore, a 20:80 mixture of syrup and water will create a mixture containing on the order of 2.8 mg/L of dissolved oxygen, and on the order of 4.2 mg/L of nitrogen. Therefore, the mixture of water and syrup typically contains up to 3 mg/L of oxygen or up to 7 mg/L of dissolved gases. If the water is not preliminarily deaerated, the dissolved oxygen may be up to about 10–12 mg/L in the syrup-water mixture.

The water (or water-syrup mixture) is then placed under a pressure of more than one atmosphere, preferably more than 4 bar, preferably under line pressure as it is being pumped from the stage at which the water and syrup were combined. Then, it is saturated with carbon dioxide, so that it contains carbon dioxide at what would be a super-saturating level at atmospheric pressure. The carbon dioxide content is typically at least 1.0 V/V (volume of gas per volume of liquid) and preferably at least 3.5 V/V. Preferably, the water is passed through a device such as a carbon dioxide injector where carbon dioxide is added. These devices are capable of creating fine gas bubbles for excellent gas-liquid interfacial mass transfer. The two-phase mixture exiting from this carbon dioxide addition stage is still under line pressure. This allows very rapid carbon dioxide dissolution into the liquid.

Other types of carbon dioxide dissolution devices can be used as a pre-carbonator other than the carbon dioxide injector (U.S. Pat. No. 4,743,405). Other inline gas dissolution devices such as supersonic mixers developed by Praxair, Inc. (e.g. U.S. Pat. No. 5,061,406) can be used. These inline gas dissolution devices are preferably chosen for this application because of their ability to create superfine bubbles of carbon dioxide which are able to dissolve over a short residence time.

Both of these devices have a venturi cone at which the liquid and carbon dioxide are accelerated to high velocity through the throat of the venturi. The pressure head or potential energy is converted into kinetic energy. For a two-phase mixture, the velocity of sound can be less than 50 ft/sec. Therefore, the velocity of the two-phase mixture can exceed the sound velocity, or in a supersonic two-phase flow regime. Upon exit from the throat of the venturi, the velocity is reduced and an intensive shockwave is formed. This shockwave breaks the gas bubbles into very tiny bubbles. At the expansion cone, the kinetic energy is converted back into potential energy and pressure head.

The pressure head inside the line allows the carbon dioxide to be completely dissolved without residual carbon dioxide bubbles. This is important because a two-phase flow without equilibrated carbon dioxide bubbles will interfere with the operation of the downstream stripper/carbonation unit.

Countercurrent gas dissolution devices are not preferred. Although countercurrent gas dissolution is an effective device, excessive carbon dioxide must be vented. The pressure is lost at the bottom of the tower and a separated pump has to bring the liquid pressure and velocity up. By the time the line pressure is reached, the liquid no longer has the same equilibrium concentration as in high-pressure dissolution. The benefits of the present invention can not then be fully realized.

Pressure is maintained on the carbonated liquid after it is saturated with the carbon dioxide. The pressure should be at least sufficiently high that no oxygen (air) or other gas evolves. Preferably, and conveniently, this pressure is at least equal to the pressure on the liquid before saturation with carbon dioxide. Maintaining the elevated pressure without loss of pressure between the carbon dioxide saturation stage and the subsequent stage, where dissolved oxygen (air) is permitted to evolve, is critical because any reduction in pressure at this point will cause the liquid to foam. Foaming will stop the operation of this process or severely hinder the amount of carbon dioxide one can add.

The properly mixed carbonated liquid is next fed to an air removal stage in which dissolved oxygen (air) is permitted to evolve from the mixture, while some more carbon dioxide is dissolved into the liquid, all while pressure is maintained in a gas space over the liquid. A suitable device for use as the air removal unit used in this stage can be a drum with trays and baffles inside to increase the gas-liquid contacting time. Trace dissolved oxygen or air, whether from syrup or from the water, is stripped out of the liquid.

A small amount of carbon dioxide is further dissolved into the liquid in this stage, preferably to the maximum of carbon dioxide solubility under the conditions present within this stage. The stripped and fully carbonated product is then removed from the unit. The total content of dissolved gas (other than carbon dioxide) in the product emerging from this stage is less than 1 mg/L of dissolved oxygen or less than 2.5 mg/L of dissolved air and often less than 0.01 mg/L of dissolved oxygen or less than 0.025 mg/L of dissolved air.

The pressure over the liquid mixture in this stage should be at least 1 barg and preferably at least 3 barg. While this pressure is maintained, the dissolved oxygen (air) is removed. By using a pressure regulator or maintaining a small purge on top of the unit, the oxygen (air) stripped out of the product is removed from the system. Since this unit is typically a counter-current flow device, the purge rate can be very small even with a high percentage of air to be removed. It is important that this purge is carried out under pressure. If the pressure inside the unit is reduced too much, more dissolved air may be removed but the dissolved carbon dioxide level will also be reduced, resulting in a flat tasting product with insufficient carbonation. Furthermore, at too low a pressure, foaming can occur inside the unit, resulting in the loss of product.

Since the stripped and fully carbonated beverage contains very little dissolved air as a catalyst to promote foaming, it has a much lower tendency to foam and spill over. This reduces the loss of raw material and avoids variations in filling levels in bottles and cans.

Furthermore, a carbonated beverage produced in this way without dissolved air will de-carbonate at a lower rate than a beverage made otherwise which would contain a higher amount of dissolved air. Therefore, lower filling pressure can be used while maintaining the same amount of dissolved carbon dioxide in the capped bottles or cans. Reducing the filling pressure brings the benefits of less carbon dioxide loss during filling. This is simply accomplished by dropping the pressure to a lower level instead of operating at a higher level. For example, a reduction of 4.0 Kg/cm$^2$ of pressure to 3.0 Kg/cm$^2$ can save 10–15% of the carbon dioxide. A reduction of pressure will also reduce the number of bottles exploded or deformed during filling, thus promoting safety and saving raw materials and bottles.

One skilled in the art would expect that the sequence of two steps in this invention is not an economical method because a two-step process would be expected to use more carbon dioxide than a single step process. One would normally choose instead to improve the carbonator performance. However, it was surprising to discover in this invention that the two-step process actually ends up using less carbon dioxide because the filler can now operate with less carbon dioxide loss.

EXAMPLE 1

In this example, a soda was produced using the method of the present invention. The goal was to achieve a carbonation level of 3.8 v/v at 5° C. with reduced foaming and improved productivity. A carbon dioxide injector was used. The oxygen/air removal stage used a "Carbocooler" (Mojonnier) OA-9317 with a pressure relief setting above the soda filling pressure but below the carbon dioxide supply pressure. This device provides countercurrent gas/liquid contact and contains several chilled plates. Liquid cascades down the plates as gas passes over the liquid surface.

The results showed that by adding carbon dioxide at the injector, keeping the syrup-water mixture under line pressure, and only thereafter evolving dissolved oxygen (air), the system was able to reduce the total $CO_2$ losses by 12%. By filling at lower pressure as becomes possible with the present invention, the filler experienced an 83% reduction in the incidence of bottles bursting.

Carbonation in line under pressure resulted in filling pressure reduction from the conventional 4.5 $Kg/cm^2$ to 2 $Kg/cm^2$ (gauge). From these data it follows that about 3.4 v/v of $CO_2$ was dissolved at the injector stage. The filling pressure reduction allows substantial improvement in operating performance.

Details of the test results are shown in the tables below.

In Table 1 the carbon dioxide losses are the amount of carbon dioxide vented with air evolved in the air removal stage, normal incidental operational losses, and losses during the pressure let down cycle in the filler prior to capping the bottles. It is the difference between the total amount of carbon dioxide used and the amount actually remaining in the soda bottles.

TABLE 1

Monthly $CO_2$ Losses During Soda Production

| | $CO_2$ Losses (%) | |
|---|---|---|
| | Conventional | Present Invention |
| Month 1 | 48 | 35 |
| Month 2 | 50 | 37 |
| Month 3 | 44 | 31 |

Table 2 shows the reduction in burst glass bottles. Besides reduction in machine stoppages, substantial savings were achieved with this invention because for each burst bottle 9 other bottles nearby need to be discarded.

TABLE 2

Glass Bottles Burst Per Hour

| Glass Bottle Size | Conventional | Present Invention |
|---|---|---|
| 1 liter | 12 | 1 |
| 290 ml | 30 | 6 |

Before the bottle is capped, it is exposed to the atmosphere for a short time. In this process, the pressure in the headspace of the bottle is vented, resulting in a loss of $CO_2$. At higher pressures, more $CO_2$ must be vented during this step than at lower filling pressures.

After the soda is filled into a bottle, a certain amount of time is needed for the carbon dioxide to evolve from the solution. With less foaming, the filling and capping speed can be sped up. This reduces the amount of carbon dioxide lost to the atmosphere and the amount of carbon dioxide needed for the process.

Table 3 shows the productivity gain in one typical filler due to less foaming, more stable operation and fewer stoppages. The productivity increased by 15%.

TABLE 3

Line Productivity:
Cases of Filled Soda Bottles per Hour

| Conventional | Present Invention |
|---|---|
| 1,310 | 1,511 |

EXAMPLE 2

Line Speed Increase Due to Decreased Foaming: Grape Soda PET 2 L

This example demonstrates how much line speed improvement one could attain by reducing foaming in a high foaming product. Grape soda is one of the most difficult products to bottle. The grape flavor is a surfactant causing higher than normal foaming. As a result, this line runs considerably below design speed, 18,000 bottles/hr versus 22,000 bottles/hr design speed. The reduction in line speed is required to give the bottle more time for controlled venting so that the foam can settle before capping.

Table 4 below contains the results from these tests. As can be seen in the table, during this test, line speed was increased from 18,000 2 L bottles per hour to 21,500 2 L bottles per hr, nearly 20% improvement.

EXAMPLE 3

Reduction in Utility and Feedstock Use—Cola, PET 2 L

Results from these tests are included in Table 4. In these tests, the present invention permitted reduction of the filling pressure from 6 barg to 3.8 barg. As these tests were designed to determine how much foaming was reduced, line speed was to be held constant because normally increasing the line speed increases foaming. However, here it was found that line speed could be increased without increasing foaming. When the line pressure was reduced, the liquid flow of the pump increased by 7%, and the liters produced per hour actually exceeded the design specifications of the equipment used in the oxygen/air evolution stage (49,000 vs. 48,000 L/hr). This was an additional useful and unexpected benefit.

Syrup losses were monitored over one week in systems using the invention and using the conventional method. Syrup loss was nearly cut in half by using the present invention.

At about the same time as these tests, the present invention was in use on approximately 50% of the lines at this plant. Monitoring of the plant-wide $CO_2$ usage during these tests is also reported in Table 4. The data show a nearly 1/3 reduction of $CO_2$ losses (from 70% additional $CO_2$ required above the amount placed in final product to only 45% additional $CO_2$ required).

TABLE 4

Production tests at Producer.
(Carbon dioxide injection in Example 2 was between 1.8
and 2 v/v $CO_2$; carbon dioxide injection in Example 3
was between 2 and 2.5 v/v $CO_2$.)

|  | Example 2 | Example 3 |
|---|---|---|
| Product | Grape Soda | Cola |
| Air removal stage: unit | Paramix (KHS) | Paramix |
| Air removal unit flow capacity (L/hr) | 44,000 | 48,000 |
| $CO_2$ level spec. (v/v) | 3.5 | 4.2 |

|  | Conventional | Present Invention | Conventional | Present Invention |
|---|---|---|---|---|
| Temperature in air removal unit (° C.) | 4 | 4 | 4 | 4 |
| Pressure in air removal unit (barg) | 4.5 | 2.5 | 6 | 3.8 |
| Average 2L PET bottles produced/hr | 18000 | 21500 | 2300 | 24500 |
| Syrup losses (liters/day) | not measured | not measured | 500 | 250 |
| Plantwide $CO_2$ use average, % of theoretical (one month) | 170% | 145% | | |

EXAMPLE 4

In-line Carbon Dioxide Injection used to Reduce Dissolved Air in Plant Production of Orange Soda (290 ml Glass)

In this example, the effect of the present invention on dissolved air was tested. Measurements of the dissolved oxygen resulting from using the present invention, and from using conventional methods, were taken. Table 5 summarizes:

TABLE 5

Comparison of dissolved oxygen

|  | Example 4 |
|---|---|
| Product | Orange Soda, 290 ml glass |
| Air removal unit: Type | Carbocooler Mojonnier OA-9317 |
| Air removal unit flow capacity (bottles/hr) | 22,000 |
| $CO_2$ level spec. (v/v) | 3.0 |

|  | Conventional | Present Invention |
|---|---|---|
| Temperature in air removal unit (° C.) | 4 | 4 |
| Pressure in air removal unit (barg) | 5.5 | 2 |
| Pre-carbonation level (v/v) | 0 | 1.7 |
| Final carbonation level measured (v/v) | 2.8 | 2.8 |
| Dissolved oxygen after air removal unit (ppb) | 170 | 20 |

This process added a small amount of $CO_2$ in a de-aerator for the water before the water was mixed with the syrup, so a low level of $CO_2$ is present even before injection (~0.7 v/v $CO_2$). From measurements of dissolved oxygen in the de-aerated process water and syrup, and knowing the syrup:water feed ratio, the dissolved oxygen entering the air removal unit was determined to be between 100 and 200 ppb. The inlet dissolved oxygen was estimated by measuring the dissolved oxygen in the de-aerated process water and the syrup.

Therefore, with the conventional treatment, there was little reduction in dissolved oxygen. However, the present invention including in-line carbon dioxide injection resulted in 80–90% reduction of dissolved oxygen. Prior to this experiment, one would have expected that the pressure in the air removal unit would have to be below the saturation pressure in order to substantially remove dissolved air, as the $CO_2$ would have to be coming out of solution. However, these experiments demonstrate that in the air removal unit $CO_2$ was going into solution. Despite this, dissolved oxygen (and by logical extension, dissolved air) was reduced.

What is claimed is:

1. A process for producing a carbonated beverage having a reduced tendency to undesired foaming, comprising:
    (a) providing water which contains dissolved therein air or oxygen, and maintaining a pressure greater than atmospheric on said water;
    (b) saturating said water with carbon dioxide while maintaining sufficient pressure thereon that no gas evolves therefrom, and feeding the resultant mixture to step (c) while maintaining sufficient pressure thereon that no gas evolves therefrom; and
    (c) removing dissolved air or oxygen from the mixture formed in step (b) while dissolving additional carbon dioxide into said mixture and maintaining over said mixture a gas space having a pressure greater than atmospheric.

2. A process according to claim 1 wherein the dissolved oxygen or air that is removed from the mixture is vented away from the mixture while the pressure is maintained over the mixture.

3. A process according to claim 1 wherein in step (c) said gas space contains carbon dioxide.

4. A process according to claim 1 wherein the water provided in step (a) contains air dissolved therein, and air is removed therefrom in step (c).

5. A process according to claim 1 wherein the pressure maintained on the mixture as it is fed to step (c) is at least equal to the pressure on the liquid before saturation with carbon dioxide.

6. A process for producing a carbonated beverage having a reduced tendency to undesired foaming, comprising:
    (a) providing a mixture of water and syrup, which mixture contains dissolved therein air or oxygen, and maintaining a pressure greater than atmospheric on said mixture;
    (b) saturating said mixture with carbon dioxide while maintaining sufficient pressure thereon that none of said dissolved gas evolves therefrom, and feeding the resultant mixture to step (c) without reducing the pressure thereon to a point that dissolved gas evolves therefrom; and
    (c) removing dissolved air or oxygen from the mixture formed in step (b) while dissolving carbon dioxide into said mixture and maintaining over said mixture a pressure greater than atmospheric.

7. A process according to claim 6 wherein the dissolved oxygen or air that is removed from the mixture is vented away from the mixture while the pressure is maintained over the mixture.

8. A process according to claim 6 wherein in step (c) said gas space contains carbon dioxide.

9. A process according to claim 6 wherein the water provided in step (a) contains air dissolved therein, and air is removed therefrom in step (c).

10. A process according to claim 6 wherein the pressure maintained on the mixture as it is fed to step (c) is at least equal to the pressure on the liquid before saturation with carbon dioxide.

11. A process for producing a carbonated beverage having a reduced tendency to undesired foaming, comprising:
  (a) providing water which contains dissolved therein air or oxygen, and maintaining a pressure greater than atmospheric on said water;
  (b) adding sufficient carbon dioxide to the water to provide a carbon dioxide content of at least 1.0 volume of carbon dioxide per volume of water while maintaining sufficient pressure thereon that no gas evolves therefrom, and feeding the resultant mixture to step (c) while maintaining sufficient pressure thereon that no gas evolves therefrom; and
  (c) removing dissolved air or oxygen from the mixture formed in step (b) while dissolving additional carbon dioxide into said mixture and maintaining over said mixture a gas space having a pressure greater than atmospheric.

12. A process according to claim 11 wherein the dissolved oxygen or air that is removed from the mixture is vented away from the mixture while the pressure is maintained over the mixture.

13. A process according to claim 11 wherein in step (c) said gas space contains carbon dioxide.

14. A process according to claim 11 wherein the water provided in step (a) contains air dissolved therein, and air is removed therefrom in step (c).

15. A process according to claim 11 wherein the pressure maintained on the mixture as it is fed to step (c) is at least equal to the pressure on the liquid before saturation with carbon dioxide.

16. A process for producing a carbonated beverage having a reduced tendency to undesired foaming, comprising:
  (a) providing a mixture of water and syrup, which mixture contains dissolved therein air or oxygen, and maintaining a pressure greater than atmospheric on said mixture;
  (b) adding sufficient carbon dioxide to the water to provide a carbon dioxide content of at least 1.0 volume of carbon dioxide per volume of water while maintaining sufficient pressure thereon that none of said dissolved gas evolves therefrom, and feeding the resultant mixture to step (c) without reducing the pressure thereon to a point that dissolved gas evolves therefrom; and
  (c) removing dissolved air or oxygen from the mixture formed in step (b) while dissolving carbon dioxide into said mixture and maintaining over said mixture a pressure greater than atmospheric.

17. A process according to claim 16 wherein the dissolved oxygen or air that is removed from the mixture is vented away from the mixture while the pressure is maintained over the mixture.

18. A process according to claim 16 wherein 16 wherein in step (c) said gas space contains carbon dioxide.

19. A process according to claim 16 wherein the water provided in step (a) contains air dissolved therein, and air is removed therefrom in step (c).

20. A process according to claim 16 wherein the pressure maintained on the mixture as it is fed to step (c) is at least equal to the pressure on the liquid before satuaration with carbon dioxide.

* * * * *